(12) United States Patent
Gebhardt et al.

(10) Patent No.: US 12,155,716 B2
(45) Date of Patent: Nov. 26, 2024

(54) DATA TRANSMISSION SYSTEM, VEHICLE COMPRISING THE DATA TRANSMISSION SYSTEM, DATA TRANSMISSION METHOD AND COMPUTER PROGRAM

(71) Applicant: Aptiv Technologies AG

(72) Inventors: Patrik Gebhardt, Schwelm (DE); Peet Cremer, Düsseldorf (DE); Daniel Schugk, Bergisch Gladbach (DE)

(73) Assignee: Aptiv Technologies AG, Schaffhausen (CH)

(*) Notice: Subject to any disclaimer, the term of this patent is extended or adjusted under 35 U.S.C. 154(b) by 0 days.

(21) Appl. No.: 18/130,051

(22) Filed: Apr. 3, 2023

(65) Prior Publication Data
US 2023/0353631 A1   Nov. 2, 2023

(30) Foreign Application Priority Data

Apr. 4, 2022  (GB) ..................................... 2204934

(51) Int. Cl.
*H04L 67/10* (2022.01)
*G06F 12/14* (2006.01)

(52) U.S. Cl.
CPC .......... *H04L 67/10* (2013.01); *G06F 12/1458* (2013.01); *G06F 2212/1052* (2013.01)

(58) Field of Classification Search
CPC ................................ H04W 4/40; H04L 67/12
See application file for complete search history.

(56) References Cited

U.S. PATENT DOCUMENTS

| 10,833,881 B1 | 11/2020 | Jindal et al. |
| 2003/0236856 A1 | 12/2003 | Bird et al. |

(Continued)

FOREIGN PATENT DOCUMENTS

WO   WO-2021143190 A1 * 7/2021

OTHER PUBLICATIONS ("Lock free pub/sub queue", ip.com Journal, ip.com disclosure No. IPCOM000185635D, Jul. 29, 2009) (Year: 2009).*

(Continued)

*Primary Examiner* — Caroline H Jahnige
(74) *Attorney, Agent, or Firm* — Harness, Dickey & Pierce, P.L.C.

(57) ABSTRACT

Provided is a data transmission system, a vehicle comprising the data transmission system, a data transmission method and a computer program. Specifically, the system comprises a centralized controller, a publisher entity and a subscriber entity; wherein the publisher entity and the subscriber entity are compiled with a predefined data format; the publisher entity registers at the centralized controller with topic information; the centralized controller, upon registration of the publisher entity, stores the topic information with information for registering at the publisher entity; the subscriber entity subscribes at the centralized controller to the topic information; the centralized controller, upon subscription of the subscriber entity, provides to the subscriber entity information for registering at the publisher entity; and the subscriber entity creates the communication channel between the publisher entity and the subscriber entity based on the information for registering at the publisher entity.

15 Claims, 3 Drawing Sheets

(56) References Cited

U.S. PATENT DOCUMENTS

| | | | |
|---|---|---|---|
| 2012/0166556 A1* | 6/2012 | Kim | H04L 67/1065 |
| | | | 709/206 |
| 2017/0012916 A1* | 1/2017 | Lieu | H04L 51/18 |
| 2019/0149487 A1* | 5/2019 | Hafri | H04L 47/826 |
| | | | 709/206 |
| 2020/0209855 A1* | 7/2020 | Shen | B60R 16/0231 |
| 2022/0155992 A1* | 5/2022 | Nortman | G06F 9/544 |

OTHER PUBLICATIONS

Combined Search and Examination Report issued by the UK Intellectual Property Office in connection with International Application No. GB2204934.0, dated Nov. 24, 2022.

Search Report and Written Opinion issued by the UK Intellectual Property Office in connection with International Application No. GB2204934.0, dated Nov. 22, 2022.

* cited by examiner

DATA TRANSMISSION SYSTEM, VEHICLE COMPRISING THE DATA TRANSMISSION SYSTEM, DATA TRANSMISSION METHOD AND COMPUTER PROGRAM

CROSS-REFERENCE TO RELATED APPLICATION

This application claims the benefit of Great Britain patent application serial number GB 2204934.0 filed on Apr. 4, 2022. The entire contents of which are hereby incorporated by reference herein.

TECHNICAL FIELD

The present disclosure relates to a data transmission system, a vehicle comprising the data transmission system, a data transmission method and a data transmission program for causing a computer to carry out the data transmission method.

BACKGROUND

Modern control systems utilize multiple data streams from different sensors to compute control instructions. Therefore, such systems typically implement multiple entities in a distributed approach, wherein each entity of the system is implemented as a node capable of sending messages to different nodes. E.g. in the commonly used multi-node system ROS/ROS2 (short for "Robot Operating System"), nodes are implemented both in a distributed and asynchronous manner. Herein, messages are sent in a predefined message format, wrapped around a data structure. Such multi-node systems also maintain a level of modularity, which allows to later replace one node by a different node with an improved version or added functionality.

For the exchange of messages, typically, a so-called publisher-subscriber pattern is implemented, where one node can offer (i.e. "publish") data as messages of a certain type under a certain name (e.g. a "topic") and other nodes interested in that data can receive the data by subscribing to the name and receiving the associated messages once they become available. By implementing a predefined message format, nodes can be programmed in different programming languages and still communicate with each other despite independent internal functioning. This independence facilitates flexibility to the development and prototyping process. The transfer of messages between nodes typically occurs via a broker protocol e.g. over ethernet. This allows nodes (even on different host machines in a network) to communicate and build up a distributed system.

SUMMARY

The subject-matter of the independent claims solves the technical problems of the state of the art, as outlined throughout this disclosure. The dependent claims describe further preferred embodiments.

The data transmission system, the corresponding method and the computer program of the present disclosure achieve secure data transmission whilst reducing computing overhead. Specifically, overhead and latency are reduced, because the use of a common data format avoids the necessity for de/serializing data, whereby fewer computing resources are required to prepare, send and decode messages and data. Further, data integrity and security are ensured, because entities can be identified as having different read/write access rights, whereby e.g. accidental modification and corruption of data is prevented. Further, data transmissions are synchronized, because the use of communication channels (as will be described in detail below) ensures that entities can be informed about new data and can acquire the data at the same time.

Further advantages are explained in more detail in the following description of the present disclosure and in reference to the enclosed drawings.

DETAILED DESCRIPTION

Figure 1:
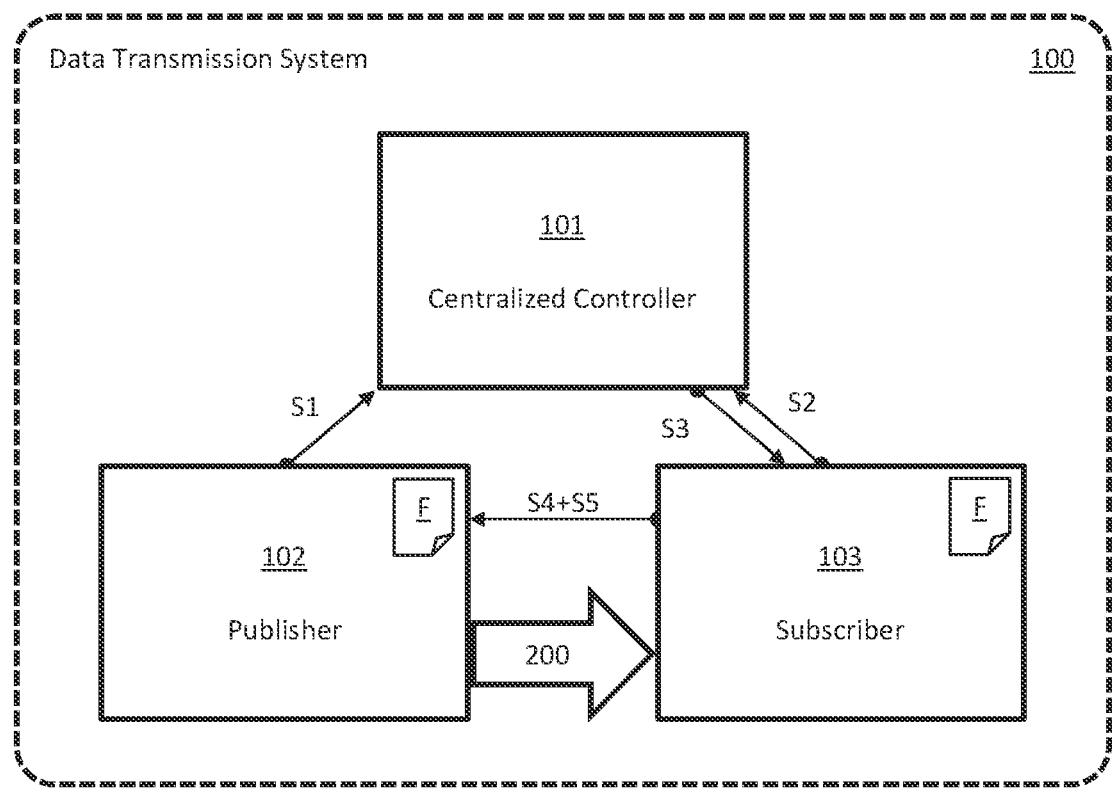
FIG. 1 illustrates an exemplifying representation of a data transmission system according to an embodiment of the present disclosure.

However, in the context of advanced driver assistance systems (ADAS) and autonomous driving systems (ADS), such distributed systems are not essential and traditional multi-node systems add additional computational and resource overhead, whereby latency is increased. E.g. although some multi-node systems advertise the possible advantage of using different programming languages or node technologies, this feature requires making messages digestible or understandable by every node in the system. Specifically, consequences of implementing this feature are:

a) Serialization and deserialization of messages: To transfer information over a predefined (broker) protocol, messages need serializing on the sender side and deserializing on the receiver side. Both steps introduce computational overhead and increase the amount of computational resources required by each side e.g. for buffering data in local memory essentially twice but effectively copying it once. The two steps also introduce latencies, even if sufficient computing power is provided. For small and non-frequent messages (e.g. host state information) the total added latency may be almost negligible. However, in ADAS/ADS scenarios where bigger data types (e.g. LiDAR point clouds, compressed data cubes (CDC) from a radar, high resolution camera feeds etc.) are used, the added latency becomes too large in that it prohibits real-time control. E.g. in case of an emergency braking system based on CDC information, the added latency significantly increases the time needed to make a braking decision. Therefore, latency introduced by message digestion directly influences the quality and safety of ADAS/ADS.

b) Synchronization of nodes:

As stated above, nodes are typically implemented as an asynchronous distributed system. To assure that control decisions are made based on relevant and not outdated data, synchronization is required. However, this synchronization also introduces overhead and latencies. After all, publishing nodes are executed independently, but the data consuming nodes have to process multiple pieces of data in the correct time series (i.e. in the correct order and at the correct time). This added overhead and latency can also prohibit real-time control resulting in the same problems outlined above.

c) Trading off between latency and security:

Furthermore, the implemented message format is not necessarily secure. This means that messages sent between sender and receiver can be lost based on various circumstances (e.g. due to packet loss in an UDP/IP network). Additionally, there is no guarantee that the received message has not been modified (accidentally or purposefully). There exists a selection of different message broker formats with varying trade-offs between latency and reliability. However, in the context of ADAS/ADS such a trade-off has direct safety implications e.g. since using outdated or falsified data for making control decisions for an autonomous vehicle may result in unexpected or inconvenient driving behavior (in a better case) or in an accident or loss of life (in a worse case).

d) Limitations when configuring autonomous systems:
The development of ADAS/ADS requires a re-simulation (ReSim) framework to replay recorded scenarios of sensor data to verify and evaluate the performance of the deployed algorithms with different parameters, configurations or system pipelines. Hence a ReSim framework allows to effectively simulate the system as being in a vehicle and behave as closely as possible to actually being deployed in a real vehicle (i.e. in a live mode). This allows to essentially develop the system against the ReSim framework and later test it also in the real vehicle without the need to adapt any interfaces or rebuild the system within a specific environment. A ReSim framework also allows a speedup of and parallel execution of simulations with different parameters, whereby the time taken to configure the control system may be reduced. However, such a speedup requires significant computational power, especially when overhead is added by the multi-node system, and any latency (even if it may be negligible in live mode) also hinders the verification and evaluation process since it slows down the execution of ReSim.

Publicly available frameworks such as dSPACE or ROS/ROS2 have tried to tackle some of the problems described above. E.g. some latency issues are addressed by using shared memory for centralized systems and serialization overhead can partially be reduced by restricting the user to predefined interfaces and data messages. However, those approaches only partially resolve the latency, overhead and security issues as outlined above.

Before diving into the description of the embodiments, in the following sub-sections, first some terminology used in the description is described. This terminology and the concepts conveyed thereby mutually apply to the embodiments that are described afterwards.

g) Terminology
i) Smart Pointer

A pointer is a general concept for a variable that contains an address in memory. This address references, refers to or "points at" some other data. The most common kind of pointer is a "reference pointer" also referred to as just "reference". References borrow the value they point to and do not have any special capabilities other than referring to data in memory. Also, they do not have any overhead and are the kind of pointer used most often.

A "smart pointer" on the other hand is a structure that not only acts like a pointer but also has additional metadata and capabilities. E.g. a reference counting smart pointer is a kind of smart pointer that enables having multiple owners of data by keeping track of the number of owners and, when no owners remain, cleaning up the data e.g. by deallocation of the smart pointer; the referenced memory may also be freed.

Additionally, whilst a reference pointer typically enables modifying the data it references, a smart pointer may implement the concept of "data ownership" and "data borrowing". A record in the metadata of the smart pointer may indicate which node is the owner of the smart pointer and may modify the referenced data and which node is the borrower of the smart pointer and may only read (but not modify) the referenced data. Alternatively, instead of recording which node is owner and borrower, a system implementing both reference pointers and smart pointers may be configured such that reference pointers are pointers that only allow borrowing (i.e. allow reading) the data and smart pointers are pointers owning (i.e. allow modifying) the data they point to. In either case, smart pointers may be implemented using data structures (i.e. "structs").

ii) Communication Channel

In a system with multiple entities or "nodes" (the terms may be used interchangeably), a means allowing communication between the nodes needs to be implemented. This means is generally referred to as a "communication channel" which can be used for both synchronized and asynchronously operating nodes.

A communication channel may be implemented as a function or interface (e.g. application programming interface or API) of a receiving or "subscribing" node, allowing said node to respond to messages passed to the communication channel. Herein, the message may be a network message, or a (smart/reference) pointer referencing data. If the communication channel is implemented as a separate node between a sending or "publishing" node and the subscribing node, upon receipt of a message, the communication channel then informs (e.g. by publishing, by argument passing or by getting queried) the subscribing node that new data is available.

iii) Data Security and Integrity

Security and integrity of data requires that data in memory (e.g. the heap) is not modified by any node that does not possess ownership through a smart pointer.

h) Embodiments
i) Data transmission system

According to an embodiment of the present disclosure, a data transmission system 100 comprises a centralized controller 101, at least one publisher entity 102 and at least one subscriber entity 103. An example of such a system 100 is depicted in FIG. 1.

In the data transmission system 100 according to an embodiment of the present disclosure, the publisher entity 102 and the subscriber entity 103 are compiled with a predefined data format F used for data communication over a communication channel 200. This data format F may contain information about data type and memory size, such that an entity reading data in the predefined data format F can use the data.

In the data transmission system 100 according to an embodiment of the present disclosure, the publisher entity 102 is configured to register S1 at the centralized controller 101 with topic information, and upon registration S1 of the publisher entity 102, the centralized controller 101 is configured to store the topic information with information for registering at the publisher entity 102. As a result, the centralized controller 101 can keep a record or a list of data sources and topic information (e.g. a keyword) regarding the content of the data provided or published by the data sources. Information for registering at a publisher entity 102 may be an address, an identification, a function or an API of the publisher entity 102 for allowing another entity to communicate with or send data to the publisher entity 102; specifically, to inform the publisher entity 102 about a communication channel for publishing messages.

In the data transmission system 100 according to an embodiment of the present disclosure, the subscriber entity 103 is configured to subscribe S2 at the centralized controller 101 to the topic information, and upon subscription of the subscriber entity 103, the centralized controller 101 is configured to provide S3 to the subscriber entity 103, the information for registering at the publisher entity 102. By subscribing at the centralized controller 101 the subscriber entity 103 may send a request message containing a keyword as the topic information to the centralized controller 101 to indicate an interest of wanting to obtain data matching the keyword or topic information. If a publisher entity 102 has been registered as a data source (as described above) at the centralized controller 101, the above-described information for registering at the publisher entity 102 can be provided to allow the subscriber entity 103 to register (a communication channel 200) at/with the publisher entity 102.

In the data transmission system 100 according to an embodiment of the present disclosure, the subscriber entity 103 is configured to create S4 the communication channel 200 between the publisher entity 102 and the subscriber entity 103 based on the information for registering at the publisher entity 102. As a result, the subscriber entity 103 informs the publisher entity 102 about the communication channel (e.g. the function or API described above) allowing the publisher entity 102 to publish or send messages to the subscriber entity 103.

As a further preferred embodiment, in the data transmission system 100 according to an embodiment of the present disclosure, the publisher entity 102 is configured to create a pointer referencing data stored in memory in the predefined data format F, contain the pointer in a message, and publish the message to the communication channel 200. As a result, the transmitted message needs not contain the actual data, but only a reference, preferably a smart pointer as described above, referencing the data in memory. This makes the data transmission lightweight, since the overhead for de/serializing data in the message is avoided. After all, and as described above, the predefined data format F is known to both the publisher entity 102 and the subscriber entity 103. Hence, by associating the pointer with the predefined (binary) data format F of the referenced data (e.g. by using a corresponding datatype) a node receiving the pointer can immediately read, interpret and use the referenced data without the need of de/serialization. That is, because a datatype conveys information regarding type, structure and size of the underlying data. Thereby, overhead and latency is reduced in comparison to traditional multi-node systems.

As a further preferred embodiment, in the data transmission system 100 according to an embodiment of the present disclosure, the pointer is a data structure with metadata indicating whether an entity has read/write access to the data referenced by the pointer. Herein, the metadata provides a mechanism of security since it allows imposing read/write restrictions on entities. Whilst the metadata is preferably set up as part of the compilation of the entities, it may also be provided as a database or other document during runtime, that is referred to when reading/writing data by use of the reference (or smart pointer).

As a further preferred embodiment, in the data transmission system 100 according to an embodiment of the present disclosure, when the publisher entity 102 publishes the message, the metadata of the pointer contained in the message is set to indicate the publisher entity 102 as not having read/write access. By setting the metadata of the pointer to indicate that the publisher entity 102 no longer has read/write access to the data, it is made sure that the data in memory cannot be changed (deliberately or accidentally). Thereby, data security over the communication channel 200 is improved. The reference (or smart pointer) received by the subscriber entity 103 may indicate that it has ownership of the referenced data. Thereby, the subscriber entity 103 may amend or change the data if needed, e.g. if a binary conversion from large endian to little endian is required. The pointer may further indicate that the referenced data is only borrowed by other entities, whereby they may still be allowed to read the referenced data but prevents them from modifying it. This access restriction also reduces the risk of accidental corruption or overwriting of data since only a single entity may have ownership, but still allows certain entities to read and use the data; thereby improving the security and robustness of the multi-node system.

To reiterate, because the pointer may indicate that only one entity (e.g. the subscriber entity 103) has ownership over the referenced data, only this one entity may modify the underlying data and e.g. once a reference counter (i.e. indicating the number of existing pointers referencing to the data) reaches zero, may deallocate the pointer (e.g. by setting its reference to NULL) and (optionally) may free the memory containing the data. Thereby, the chance of a memory leak is reduced without adding additional overhead or latency for memory management.

As a further preferred embodiment, in the data transmission system 100 the publisher entity is configured to set up a collection of communication channels to which the message is published, the subscriber entity 103 is configured to set up S4 the communication channel and communicate S5 to the publisher entity information about the communication channel, and the publisher entity 102, upon registration of the subscriber entity 103, is configured to store the communication channel set up by the subscriber entity in the collection of communication channels. As a result, it becomes possible that multiple subscriber entities 103 receive data from one publisher entity 102. Since only the publisher entity 102 needs to record the communication channels 200 to which messages are to be published, little to no overhead is introduced, whilst the same mechanism as described above may be used to broadcast data. This also results in the benefit of data synchronization, since all subscriber entities 103 subscribed to the publisher entity 102 may receive the message essentially at the same time. After all, the difference in time to send a (light-weight) message as described above to one subscriber entity 103 or to many subscriber entities 103 is negligible.

As a further preferred embodiment, in the data transmission system 100 the data stored in memory is vehicle related data. Specifically, this vehicle related data may be radar data, light detection and ranging (LiDAR) data, sonar data, pressure data, voltage data and/or current data. As a result, the system 100 may be used as part of an ADAS/DAS used in a vehicle.

As a further preferred embodiment, in the data transmission system 100 the data structure comprises an section for identifying: an entity as having read/write access to the data; an indication of a type of the data stored in memory; and/or a size of the data stored in memory. Herein, the section may refer to metadata, a (binary) flag or a data field containing information for indicating the type of the stored data and/or the size of the data stored in memory. As a result, the entity identified as having read/write access, may perform the data management including reference counting and deallocating described above. Further, when indicating the type of the data stored in memory in the data structure, the entity receiving the message needs not inspect the memory at which the data is stored to determine which datatype it is. Instead, the receiving entity (e.g. the subscriber entity 103)

may simply treat the data stored in memory as being of the indicated type. Thereby, multiple predefined data formats F may be provided and the overhead for determining the actual data format F is reduced. By providing a size of the data stored in memory as part of the data structure, the receiving entity (e.g. the subscriber entity 103) may prepare or allocate memory internally in advance, i.e. before it has read out the data referenced by the pointer. As such, the receiving entity may determine whether it can already use the data or (e.g. in case the data exceeds the currently available data capacity of the receiving entity) free space to use the data.

As a further preferred embodiment, in the data transmission system according 100 the section for identifying an entity as having read/write access to the data is a region of memory storing a pointer referencing an address of the memory storing the entity having read/write access to the data. Put differently, the identification of an entity having read/write access may be realized by storing a reference to the address of the entity having read/write access. This reference may then be stored in a region of memory belonging to the data structure of the pointer of the message, e.g. in the metadata. As a result, read/write privileges can easily be tracked and enforced to assure data security.

As a further preferred embodiment, in the data transmission system according 100 the data structure further comprises a counter counting the number of entities using the data. Thereby, the feature of (automatic and/or dynamic) reference counting can be realized.

As a further preferred embodiment, in the data transmission system 100 the entity identified as having read/write access to the data is configured to perform a referencing counting (e.g. automatically and/or dynamically) to deallocate the pointer referencing the data stored in memory, if the counter (i.e. counting the number of entities using the data) becomes zero. Thereby, the centralized controller 101 does not need to perform any reference counting for every message or data sent over the communication channels 200, but entities (e.g. one or more subscriber entities 103) different to the centralized controller 101 oversee and manage the messages and data. Thereby, computational requirements of the centralized controller 101 are reduced, because they are distributed onto the other entities.

As a further preferred embodiment, in the data transmission system 100 the data structure further comprises a collection identifying one or more entities as using the data. Herein the collection may be implemented aa a list (e.g. an ordered list) or a collection (e.g. a set, or unordered list) of IDs of the one or more entities that use the data (the IDs may be the memory addresses of the entities). Thereby, the above-described concept of "borrowing" data may be realized since the collection allows identification of entities "borrowing" the data. As a result, it may be distinguished between the entity having full read/write access and other entities having only partial read/write access, e.g. read-only access.

Thereby, if the communication channel 200 is realized as a separate entity it may forward to a receiving entity (e.g. a subscriber entity 103) only a reference to the data stored in memory, whereby the receiving entity obtains only read access but no write access to the data. Similarly, if the receiving entity (e.g. a subscriber entity 103) obtains the pointer whilst having full read/write access, it may forward to other entities a reference to the data stored in memory, whereby the other entities obtain only read access but no write access to the data. As a result, it becomes possible to indicate and differentiate between the entity "owning" the data and entities "borrowing" or using the data in addition to the owner. Thereby, data management becomes less complex, because only a single entity (i.e. the owner entity having full read/write access) needs to perform data management like reference counting.

As a further preferred embodiment, in the data transmission system 100 the entity identified as having read/write access to the data is configured to perform a referencing counting (e.g. automatically and/or dynamically) to deallocate the pointer referencing the data stored in memory, if the collection (i.e. for identifying the one or more entities as using the data) becomes empty (i.e. identifies no entity as using the data). Thereby, the above-described concept is realized in that only the entity "owning" the data may be in charge of memory management, whilst the possibility for other entities to "borrow" the data may remain.

As a further preferred embodiment, in the data transmission system 100 the data transmission system is an automated driver assistance system, ADAS, an autonomous driving system, ADS, and/or a simulation system. Herein, the ADAS/ADS may be realized as a vehicle participating in traffic, but also as part of a re-/simulation system used for training control systems such as artificial intelligence (AI) systems, made in charge of steering a vehicle. In case of an AI system, training of said AI system may be speed up whilst computational load for performing the training is also reduced. After all, de/serialization or memory inspection is not necessary when transmitting data over the communication channel 200 of the data transmission system 100. Especially when executing the training as a simulation running faster than real time, the latency caused by de/serialization is avoided and speeds up the training process.

As a further preferred embodiment, in the data transmission system 100 the centralized controller or the communication channel is configured as an entity having read/write access to the data and is configured to provide to the subscriber entity the message indicating the subscriber entity as using the data only. Thereby, the above-described concept is realized, whereby a separate communication entity realizes the communication channel 200 and is "owning" the data, whilst all receiving entities (e.g. a subscriber entity 103) are only "borrowing" the data. Therefore, only dedicated communication entities need to perform memory management including e.g. reference counting, whilst all remaining entities (e.g. publisher entities 102 and subscriber entities 103) are only in charge of data processing. As a result, data security is improved and computational load imposed on publisher entities 102 and subscriber entities 103 is reduced.

As a further preferred embodiment, in the data transmission system 100 the centralized controller 101 or the communication channel 200 is configured to notify the subscriber entity 103 that new data is available and, when notified that new data is available, the subscriber entity 103, as an entity using the data, obtains the data from the communication channel 200. As a result, the subscriber entity 103 needs not actively pull or enquire about new data and instead is informed about new data in a synchronized way. This means, the subscriber entity 103 may be put into a sleep mode or power saving mode after having dealt with previous data or when no new data has been provided as of yet. Then, when new data is received by the communication channel 200, the subscriber entity 103 is notified and/or woken up to process the data. Thereby, the whole system becomes more energy efficient.

Figure 2A:
FIGS. 2A to 2C illustrate stages of a procedure corresponding an embodiment of the present disclosure.
Figure 2B:
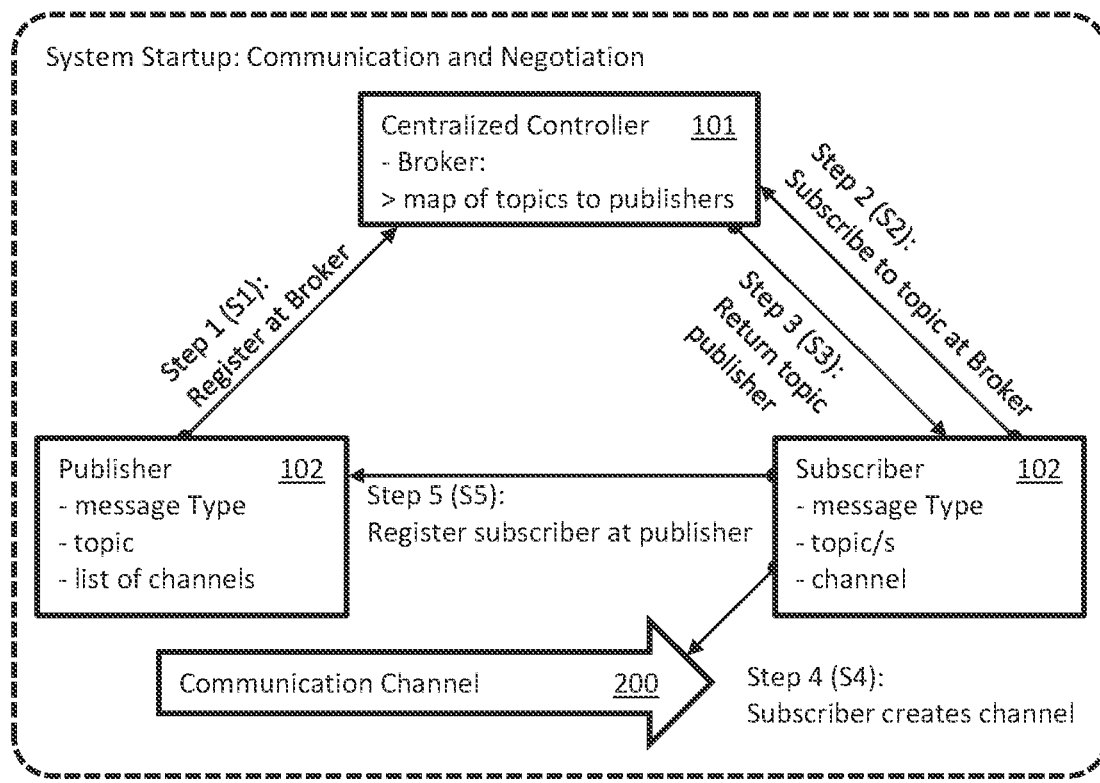
Figure 2C:
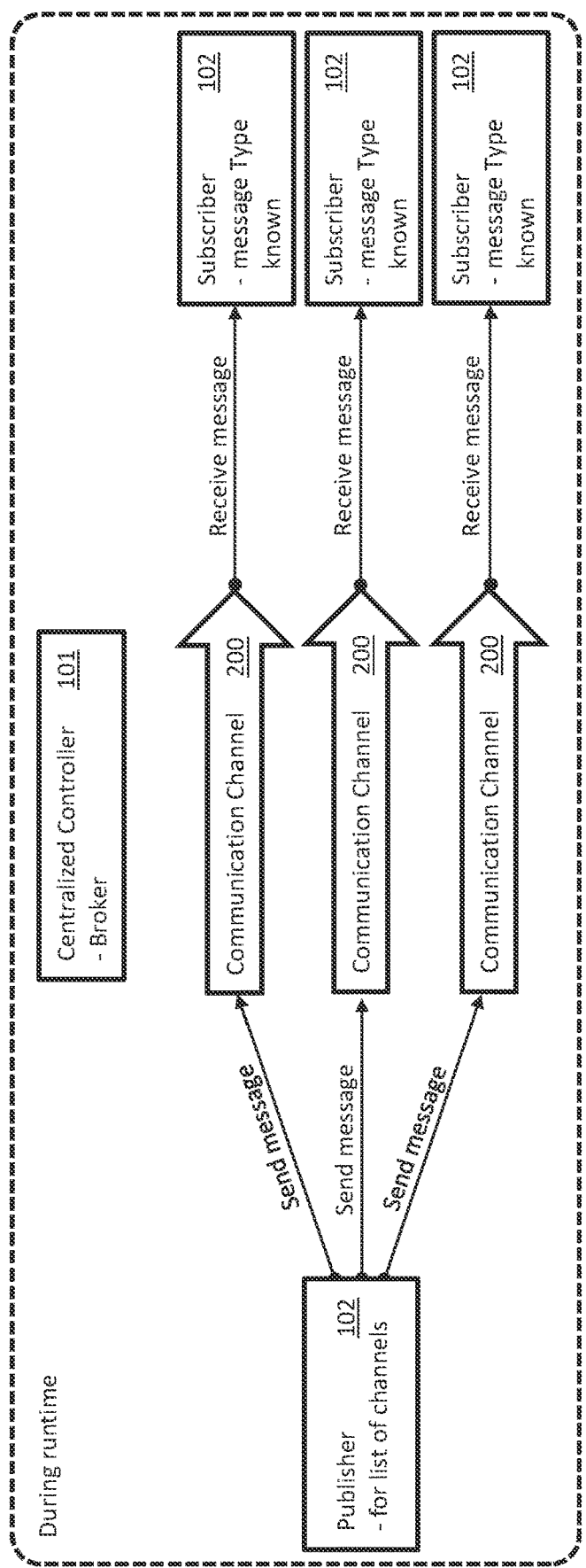

An example of the data transmission system 100 during runtime is depicted in FIG. 2C, wherein one publisher entity 102 sends messages to communication channels 200 of corresponding subscriber entities 103. The number of the entities in this example is, however, not limited to that of FIG. 2C. Herein the arrows labelled "Receive message" indicate that either the communication channel 200 notifies the subscriber entity 103 as described above and/or that the subscriber entity 103 has been indicated as an entity "owning" or "borrowing" the data.

Preferably, the central controller 101 is implemented as part of a central domain controller of a multi-node system, and each entity is implemented as a separate node of said multi-node system. However, several entities may be implemented as part of the same node, e.g. if they perform a sequence of data processing tasks.

Also, subscriber entities 103 may serve as further publisher entities 102 to transmit data to further subscriber entities 103 beyond the example depicted in FIG. 2C. This may be necessary if multiple (network) domains are managed by different centralized controllers 101 (or central domain controllers) or if a data from multiple publisher entities 102 needs to be collected by a first subscriber entity 103 and compiled into different data before publishing this different data to subsequent second subscriber entities 103. In this case, the first subscriber entity 103 may also be a publisher entity 102.

ii) Vehicle

Another embodiment of the present disclosure is a vehicle comprising a processing unit comprising the data transmission system 100 in any of the configurations as described above. All above-described aspects regarding the data transmission system 100 mutually apply hereto.

iii) Data transmission method

Another embodiment of the present disclosure is a computer-implemented data transmission method. This data transmission method matches the above-described data transmission system 100 and is exemplified with the procedure spanning FIGS. 2A to 2C.

The data transmission method according to an embodiment of the present disclosure comprises compiling at least one publisher entity 102 and at least one subscriber entity 103 with a predefined data format F used for data communication over a communication channel 200. This stage is exemplified as the compiler stage in FIG. 2A.

The data transmission method according to an embodiment of the present disclosure further comprises registering S1 the publisher entity 102 at a centralized controller 101 with topic information. This step S1 is exemplified as part of the system startup in in FIG. 2B.

The data transmission method according to an embodiment of the present disclosure further comprises, by the centralized controller 101, upon registration of the publisher entity 102, storing the topic information with information for registering at the publisher entity and (by the centralized controller 101 or the subscriber entity 102) subscribing S2 the subscriber entity 102 at the centralized controller 101 to the topic information. This step S2 is exemplified as part of the system startup in in FIG. 2B.

The data transmission method further comprises, by the centralized controller 101, upon subscription of the subscriber entity 103, providing S3 to the subscriber entity 103, the information for registering at the publisher entity 102. This step S3 is exemplified as part of the system startup in in FIG. 2B.

The data transmission method according to an embodiment of the present disclosure further comprises, by the subscriber entity 103, creating S4, S5 the communication channel 200 between the publisher entity 102 and the subscriber entity 103 based on the information for registering at the publisher entity 102. These steps S4 and S5 are exemplified as part of the system startup in in FIG. 2B and may be performed together or separately.

As a result, above-described aspects regarding the data transmission system 100 mutually apply to this data transmission method to thereby result in the same advantages as described above.

Comparable to the above-described data transmission system 100, as a further preferred embodiment, the data transmission method further comprises, by the publisher 102, creating a pointer referencing data stored in memory in the predefined data format F, containing the pointer in a message, and publishing the message to the communication channel. These step of publishing the message to a plurality of communication channels 200 (belonging to each one of a plurality of subscriber entities 103) is exemplified as part of system runtime in in FIG. 2C. Herein, the number of channels 200 and subscriber entities 103 is not limited to three, but may be any number including one or above. Similarly, the number of publisher entities 102 is not limited to one as depicted in FIG. 2C, but may be any number including one or above.

As a further preferred embodiment, in the data transmission method, the pointer is a data structure with metadata indicating whether an entity has read/write access to the data referenced by the pointer. As a result, the pointer used in the transmission method is at least similar and preferably identical to the pointer described above in reference to the data transmission system 100.

As a further preferred embodiment, in the data transmission method, when the publisher entity publishes the message, the metadata of the pointer contained in the message is set to indicate the publisher entity as not having read/write access. As a result, the same advantages described above in reference to the data transmission system 100 can be achieved.

In summary, regarding embodiments of the data transmission method, all above-described aspects regarding the data transmission system 100 may be mutually applied to this data transmission method, thereby resulting in the same advantages as described above.

iv) Computer Program

Another embodiment of the present disclosure is a computer program comprising instructions which, when the program is executed by a computer, cause the computer to carry out the above transmission method. Hence, all above-described aspects regarding the data transmission system 100 and/or the data transmission method, mutually apply to this computer program to thereby result in the same advantages as described above.

The embodiments described above can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit or component thereof, including commercially available integrated circuit components known in the art by names such as CPU chips, GPU chips, microprocessor, microcontroller, or co-processor. Alternatively, a specialized processor may be implemented in custom circuitry, such as an ASIC, an FPGA or a semicustom circuitry resulting from configuring a programmable logic device. As a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

The invention claimed is:

1. A data transmission system comprising a centralized controller, at least one publisher entity and at least one subscriber entity, wherein:
   the publisher entity and the subscriber entity are implemented in hardware and configured to use a predefined data format (F) data communication over a communication channel;
   the publisher entity is configured to register at the centralized controller with topic information;
   the centralized controller, upon registration of the publisher entity, is configured to store the topic information with publisher information for registering at the publisher entity;
   the subscriber entity is configured to subscribe at the centralized controller to the topic information;
   the centralized controller, upon subscription of the subscriber entity, is configured to provide to the subscriber entity the publisher information for registering at the publisher entity;
   the subscriber entity is configured to create the communication channel between the publisher entity and the subscriber entity based on the publisher information for registering at the publisher entity;
   the publisher entity is configured to create a pointer referencing data stored in memory in the predefined data format (F), contain the pointer in a message, and publish the message to the communication channel;
   the pointer is a data structure with metadata indicating whether an entity has read and write access to the data referenced by the pointer; and
   when the publisher entity publishes the message, the metadata of the pointer contained in the message is set to indicate the publisher entity as not having read and write access.

2. The data transmission system according to claim 1, wherein:
   the publisher entity is configured to set up a collection of communication channels to which the message is published;
   the subscriber entity is configured to set up the communication channel and communicate to the publisher entity information about the communication channel; and
   the publisher entity, upon registration of the subscriber entity, is configured to store the communication channel set up by the subscriber entity in the collection of communication channels.

3. The data transmission system according to claim 1, wherein the data stored in memory is vehicle related data.

4. The data transmission system according to claim 1, wherein the data structure comprises a section for identifying:
   an entity as having read and write access to the data,
   an indication of a type of the data stored in memory, and/or
   a size of the data stored in memory.

5. The data transmission system according to claim 4, wherein the section for identifying an entity as having read and write access to the data is a region of memory storing the pointer referencing an address of the memory storing the entity having read and write access to the data.

6. The data transmission system according to claim 1, wherein the system comprises a plurality of entities and wherein the data structure further comprises a counter counting how many entities out of the plurality of entities are using the data.

7. The data transmission system according to claim 6, wherein an entity of the plurality of entities identified as having read and write access to the data is configured to perform a referencing counting to deallocate the pointer referencing the data stored in memory, if the counter becomes zero.

8. The data transmission system according to claim 1, wherein the data structure further comprises a collection identifying one or more entities as using the data.

9. The data transmission system according to claim 8, wherein the one or more entities identified as having read and write access to the data are configured to perform a referencing counting to deallocate the pointer referencing the data stored in memory, if the collection becomes empty.

10. The data transmission system according to claim 1, wherein the data transmission system is for an automated driver assistance system, ADAS, an autonomous driving system, ADS, and/or a simulation system.

11. The data transmission system according to claim 1, wherein the centralized controller or the communication channel is configured as an entity having read and write access to the data and is configured to provide to the subscriber entity a message indicating the subscriber entity as using the data only.

12. The data transmission system according to claim 1, wherein
   the centralized controller or the communication channel is configured to notify the subscriber entity that new data is available;
   when notified that new data is available, the subscriber entity, as an entity using the data, obtains the data from the communication channel.

13. A vehicle comprising a processing unit comprising the data transmission system according to claim 1.

14. A computer-implemented data transmission method comprising:
   compiling at least one publisher entity and at least one subscriber entity with a predefined data format (F) used for data communication over a communication channel;
   registering the publisher entity at a centralized controller with topic information;
   by the centralized controller, upon registration of the publisher entity, storing the topic information with publisher information for registering at the publisher entity;
   subscribing the subscriber entity at the centralized controller to the topic information;
   by the centralized controller, upon subscription of the subscriber entity, providing to the subscriber entity the publisher information for registering at the publisher entity;
   by the subscriber entity, creating the communication channel between the publisher entity and the subscriber entity based on the publisher information for registering at the publisher entity; and
   by the publisher entity, creating a pointer referencing data stored in memory in the predefined data format (F), containing the pointer in a message, and publishing the message to the communication channel, wherein the pointer is a data structure with metadata indicating whether an entity has read and write access to the data referenced by the pointer, and when the publisher entity publishes the message, the metadata of the pointer contained in the message is set to indicate the publisher entity as not having read and write access.

15. A non-transitory computer-readable medium storing instructions which, when executed by a computer, cause the computer to carry out the method of claim 14.

* * * * *

UNITED STATES PATENT AND TRADEMARK OFFICE
CERTIFICATE OF CORRECTION

| | | |
|---|---|---|
| PATENT NO. | : 12,155,716 B2 | Page 1 of 1 |
| APPLICATION NO. | : 18/130051 | |
| DATED | : November 26, 2024 | |
| INVENTOR(S) | : Patrik Gebhardt et al. | |

It is certified that error appears in the above-identified patent and that said Letters Patent is hereby corrected as shown below:

On the Title Page

Column 1, (71) Applicant, Line 1: Delete "AG" and insert --AG, Schaffhausen (CH)-- therefor In the Claims Column 11, Line 12: In Claim 1, after "(F)", insert --for--

Signed and Sealed this
Fifteenth Day of April, 2025

Coke Morgan Stewart
*Acting Director of the United States Patent and Trademark Office*